M. R. FAIRCHILD.
GATE.
APPLICATION FILED NOV. 2, 1916.
1,237,766.
Patented Aug. 21, 1917.
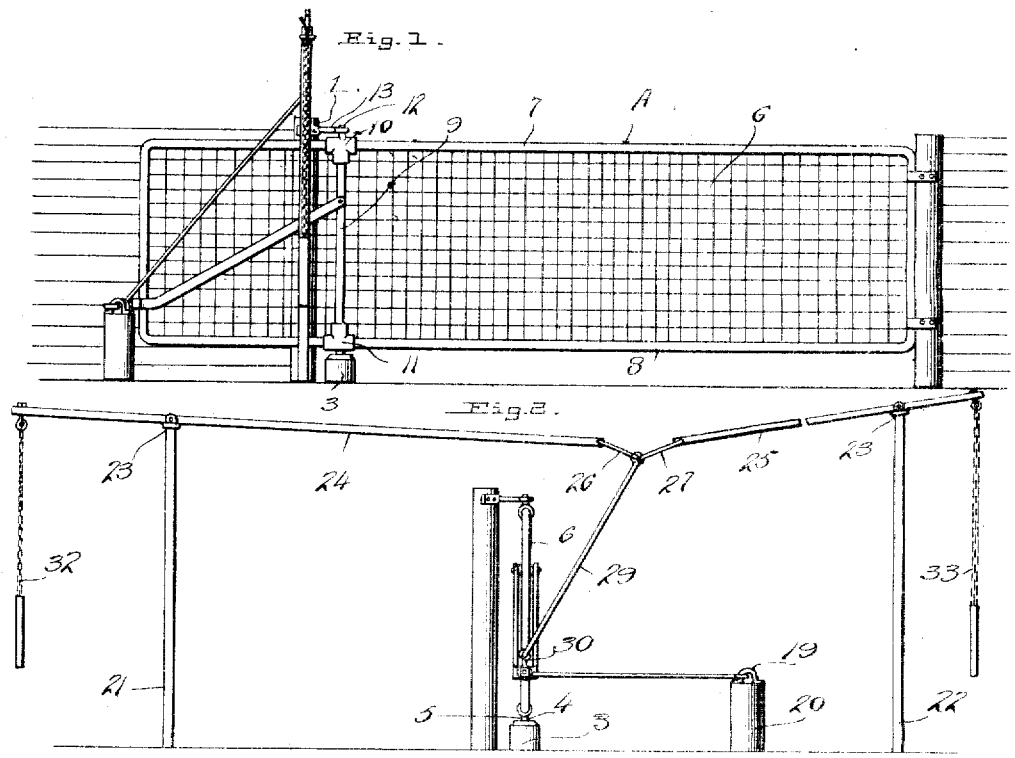
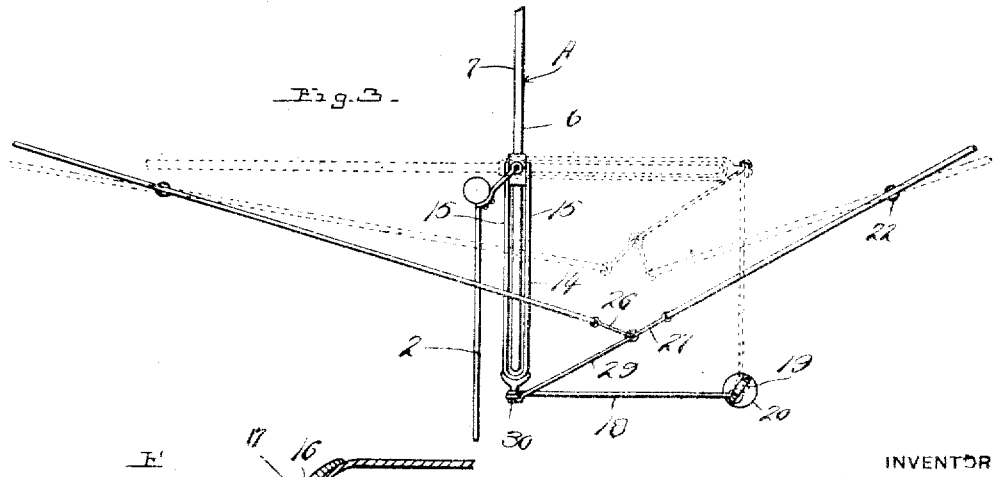
WITNESSES
INVENTOR
Meryl R. Fairchild
BY
ATTORNEY

UNITED STATES PATENT OFFICE.

MERYL R. FAIRCHILD, OF ROCHESTER, ILLINOIS.

GATE.

1,237,766.  Specification of Letters Patent.  Patented Aug. 21, 1917.

Application filed November 2, 1916. Serial No. 129,191.

*To all whom it may concern:*

Be it known that I, MERYL R. FAIRCHILD, a citizen of the United States, residing at Rochester, in the county of Sangamon and State of Illinois, have invented certain new and useful Improvements in Gates, of which the following is a specification.

This invention relates to swinging gates and more particularly to an improved construction and means for opening and closing the gate, the primary object being to provide automatically operated means for holding the gate in opened or closed position without the use of latches or other similar means.

Another object of the invention is the provision of a swinging gate adapted to be pivotally mounted upon a supporting element, the gate being connected to a plurality of levers associated with a weight whereby the gate may be manually operated and held in open or closed position by the weight.

A further object of this invention is the provision of a swinging gate which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a front elevation showing the gate in closed position.

Fig. 2 is an edge elevation showing the operating levers.

Fig. 3 is a top plan of the device, partly broken away, the dotted lines illustrating the position of the levers and the gate when the same is in open position.

Fig. 4 is a fragmentary section illustrating the manner of connecting the yoke with the weight.

Referring to the drawing, wherein is illustrated the preferred form of my invention, and in which like numerals of reference indicate corresponding parts throughout the several views, the supporting post 1 is arranged to form one side of the gate opening A and supports the strands of wire 2 which constitute the fence. Mounted in close proximity to the base of the post 1 is a short post 3 which acts as a supporting standard for the gate and is provided with a bearing 4 for receiving a pintle 5 upon which the gate is pivotally mounted for permitting the gate to swing to open or closed position.

The gate, designated by the numeral 6, comprises the upper frame bar 7 and the lower frame bar 8. When in closed position these bars extend beyond the post and overlap a portion of the fence 2 as shown by Fig. 3 of the drawing. A pivot standard 9 is carried by the frame having its ends fastened to the T-fittings 10 and 11 carried by the frame bars 7 and 8. This pivot standard 9 is in vertical alinement with the supporting post 3. The pintle 5 is secured to the lowermost T-fitting 11 and the upper fitting 10 is also provided with a pintle 12 received by a supporting arm 13 which has one end fastened to the gate post 1. This construction permits the gate to be pivotally held in vertical position at all times and a full quarter turn can be made by the gate when the same is swung to open or closed position.

It will be noted that one end of the gate is extended to project beyond the gate post 1 whereby it partially overlaps the wire strands 2 of the fence when in closed position. Embracing this portion of the gate is a guide yoke 14 which, as clearly shown by Fig. 3 of the drawing, comprises a bifurcated member having the side arms 15 the terminals of which are pivotally connected to the standard 9 adjacent the upper end thereof. The free end of the yoke or bifurcated member 14 extends around the end of the gate and is fastened to a weight 16 which is designed to embrace the end of the yoke 14 as shown by Fig. 4 of the drawing. This weight is provided with a neck 17 to which is connected a connecting rod 18 the opposite end of which is pivotally secured to a fastening loop 19 carried by the top of a short post 20 which acts as an anchor for the end of the connecting rod 18. This post 20 is arranged in the ground at a point midway of the arc traveled by the gate when the same is swung to open or closed position, being diagonally situated from the pivot point of the gate as clearly shown by Fig. 3 of the drawing.

Mounted at opposite sides of the gate and in alinement with the supporting post thereof are the lever standards 21 and 22 which have their top ends provided with rotatable caps 23 for pivotally receiving the operating levers 24 and 25. The proximate ends of the levers 24 and 25 are connected by the flexible elements 26 and 27 to one end of the lifting lever 29, the opposite end of which is engaged by a hook 30 carried by the fastening bolt 31 which secures the member 16 to the yoke 14.

When the gate is in position shown in full lines in Figs. 2 and 3, the person who desires to open the gate will grasp either one of the pull chains 32 or 33 which are carried by the levers 24 and 25 respectively, and exert a downward pull thereon. This will cause the lever to tilt on its pivot point and the lifting member 29 will raise the yoke 14 and one end of the connecting rod 18 thereby causing the gate to swing until the yoke has reached its upward limit of pivotal movement, whereupon the momentum, together with the weight 16, will cause the gate to continue to swing until it assumes the position shown by dotted lines in Fig. 3. By virtue of the connecting rod 18 being disposed in a position at right angles to its original position, the gate will be prevented from being accidentally swung to closed position. This construction prevents the gate from being swung open or closed by the wind and only a slight exertion by the person opening the gate is necessary when the pull is exerted on one of the chains 32 or 33.

From the foregoing it will be observed that a very simple and durable swinging gate has been provided, the details of which embody the preferred form. I desire it to be understood however, that slight changes in the minor details of construction may be made without departing from the spirit of the invention or the scope of the claims hereunto appended.

I claim:

1. In a swinging gate, the combination with supporting elements for pivotally receiving the gate, one portion of the gate projecting beyond the said pivoted portion thereof, a yoke embracing the said projected portion, and means carried by the end of the said yoke and anchored at a point mid-way between the length of the arc of the projecting portion of the gate for imparting a swinging motion thereto.

2. In a swinging gate, the combination with supporting elements for pivotally receiving the gate, the latter having a projecting portion extending beyond the said supporting elements, a yoke embracing the said projecting portion, an anchored post, a lever pivotally connected to the said anchored post, and means associated with the lever and coöperating with the said yoke for completing the swinging movement of the gate to open or closed position after receiving an initial swinging movement.

3. In a swinging gate, the combination with a supporting post and a fence post, means pivotally supporting the gate from the said supporting post, an anchored post, a bifurcated yoke pivotally connected to the said means, means pivotally mounted on the anchored post and disposed in the bifurcation of the said yoke, a weight carried by the end of the yoke and operating to hold the yoke downwardly, operating means including lifting levers connected to the said means for raising the said bifurcated yoke when the gate is swung whereby the swinging movement of the gate may be completed by the said downward pull of the weight.

4. In a swinging gate, the combination with a supporting post and a fence post, a bearing mounted upon the supporting post, the said fence post carrying a supporting arm having its terminal in vertical alinement with the said bearing, a pivot standard pivotally engaged with the said bearing and the said supporting arm, an anchored post, a bifurcated yoke pivotally connected to the pivot standard, means pivotally mounted on the anchored post and disposed in the bifurcation of the said bifurcated yoke, a weight carried by the end of the yoke and tending to hold the latter downwardly, lifting levers, a pair of oppositely extending operating levers pivotally mounted and having their proximate ends connected to the lifting levers for raising the said bifurcated yoke when the gate is swung whereby the swinging movement of the gate may be completed by the drop of the said weight.

5. In a swinging gate, the combination with a supporting post and a fence post, a bearing mounted upon the supporting post, the said fence post carrying a supporting arm having its terminal in vertical alinement with the said bearing, a pivot standard having its ends pivotally engaged in the said bearing and the said supporting arm an anchored post, a bifurcated yoke pivotally carried by the pivot standard, means pivotally mounted on the anchored post and connected to the said bifurcated yoke, a weight carried by the end of the yoke, lifting levers, and means connected to the lifting levers and to the said weight for lifting the said yoke whereby a swinging motion will be imparted to the said gate.

In testimony whereof I affix my signature in presence of two witnesses.

MERYL R. FAIRCHILD.

Witnesses:
J. EARL BELL,
W. H. KEMON.